United States Patent [19]

Hurst

[11] 4,316,307
[45] Feb. 23, 1982

[54] CONNECTOR FOR LOADED WIRE ROPE

[76] Inventor: George P. Hurst, 235 Hill St., Jackson, Calif. 95642

[21] Appl. No.: 71,222

[22] Filed: Aug. 30, 1979

Related U.S. Application Data

[63] Continuation-in-part of Ser. No. 861,604, Dec. 19, 1977, which is a continuation-in-part of Ser. No. 763,188, Jan. 27, 1977, Pat. No. 4,078,298.

[51] Int. Cl.³ .......................... F16G 3/00; B01F 9/00
[52] U.S. Cl. .................................... 24/31 R; 24/31 F;
366/233; 474/89; 474/101; 474/238
[58] Field of Search ............ 24/31 R, 31 F; 366/233;
474/237, 238, 89, 101, 111

[56] References Cited

U.S. PATENT DOCUMENTS

| 689,610 | 12/1901 | Gamalielson | 14/22 |
|---|---|---|---|
| 706,393 | 8/1902 | Darling | 403/312 |
| 1,099,390 | 6/1914 | Mulligan | 403/215 |
| 1,218,686 | 3/1917 | Morse | 474/89 |
| 1,581,075 | 4/1926 | Miller | 24/31 F |
| 1,684,271 | 9/1928 | Henry et al. | 24/31 F |
| 2,165,754 | 7/1939 | Hornack | 474/89 |
| 2,346,613 | 4/1944 | Rumsey, Jr. | 214/1 Q C |
| 2,496,695 | 2/1950 | Brunner | 24/31 R |
| 3,097,834 | 7/1963 | Hurst | 366/233 |
| 3,401,924 | 9/1968 | Hurst | 366/233 |
| 3,669,433 | 6/1972 | Hurst | 366/233 |
| 3,769,685 | 11/1973 | Noda | 29/526 |
| 3,853,018 | 12/1974 | Folkert | 474/89 |
| 4,114,765 | 9/1978 | Kojima | 214/1 QC |

FOREIGN PATENT DOCUMENTS

| 173468 | 7/1969 | Austria | 366/233 |
|---|---|---|---|
| 1005339 | 3/1957 | Fed. Rep. of Germany | 214/340 |
| 439366 | 1/1975 | U.S.S.R. | 214/1 QC |

*Primary Examiner*—Victor N. Sakran
*Attorney, Agent, or Firm*—Townsend and Townsend

[57] ABSTRACT

An end connector for a wire rope suspension system has a shifting mechanism for minimizing wear and has body members which inhibit undesired binding of loaded wire ropes internal to the connector. Two substantially identical body members are adapted to be preassembled in stages on the wire rope and then coupled together in place in the suspension system. Within each one of the body members is a sheave mounted to a journal bearing. The sheave bears the load of the wire rope on the body and can rotate under load to minimize frictional resistance to desirable displacement of the body piece relative to the rope ends. The end connector with displaceable load-bearing body members minimizes wear and increases the life of wire rope suspension systems.

5 Claims, 4 Drawing Figures

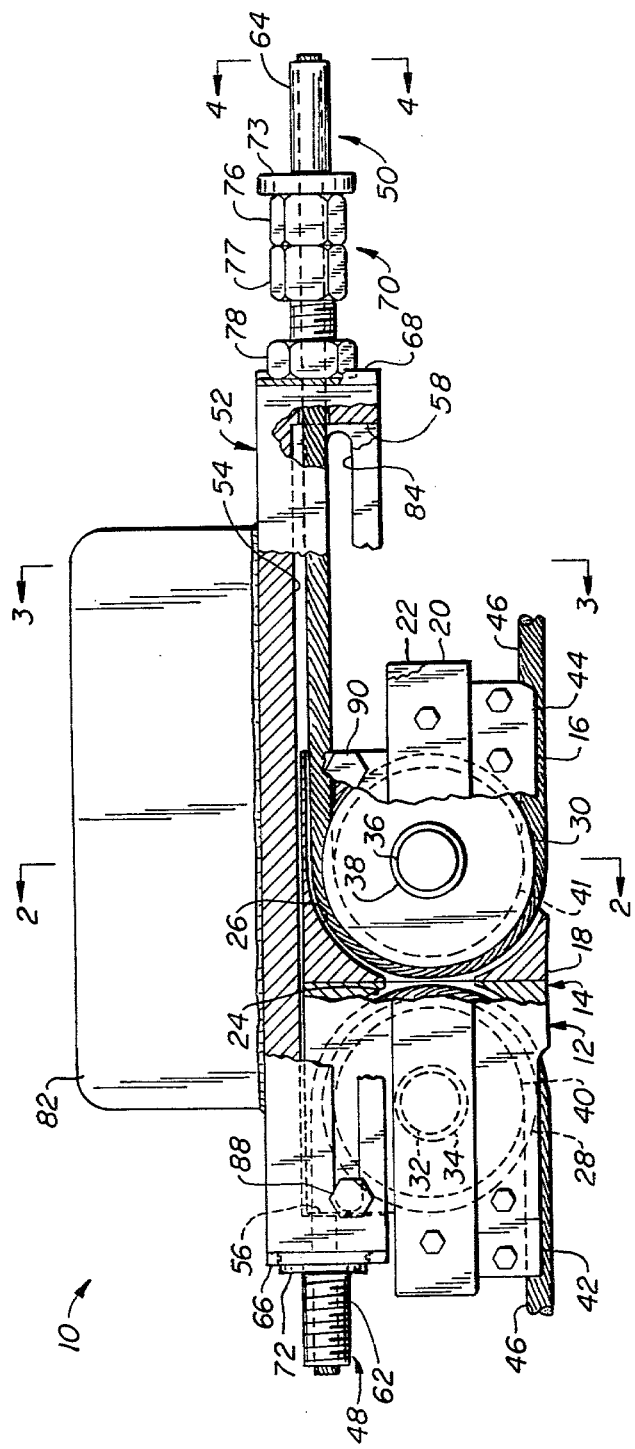
FIG._1.

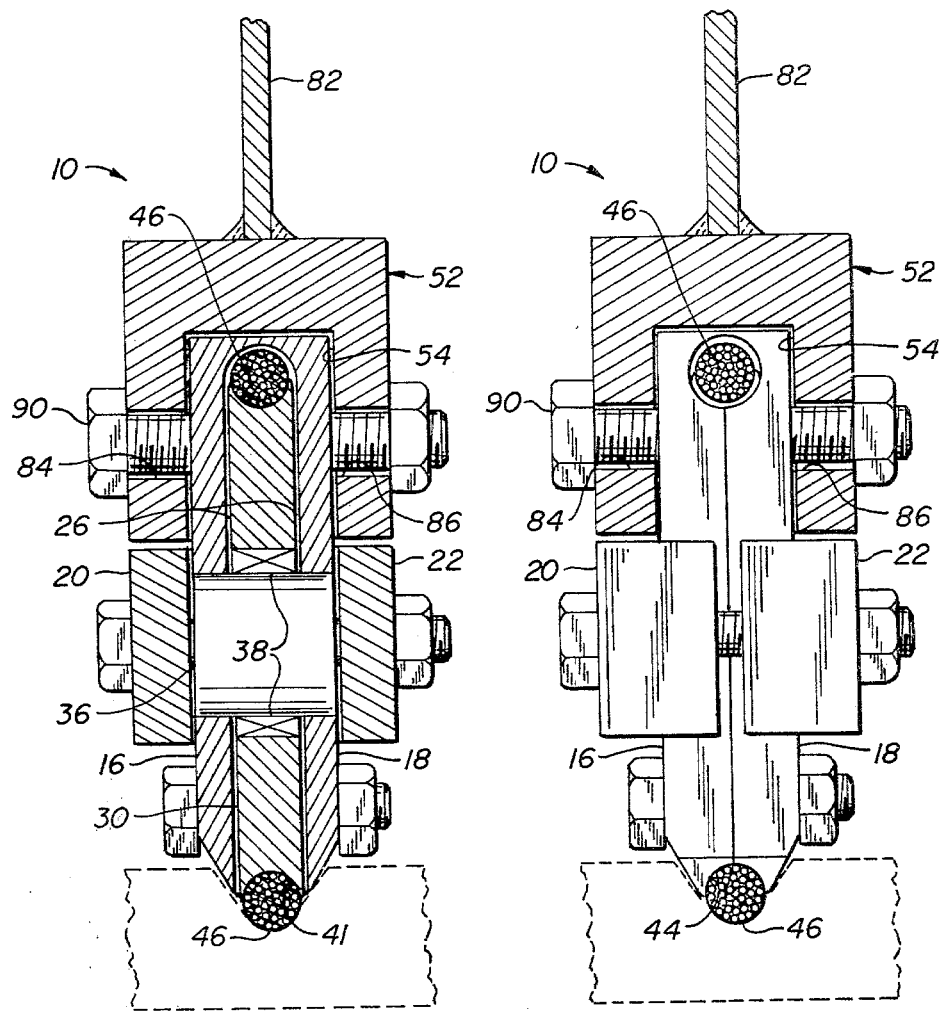
FIG._2.  FIG._3.
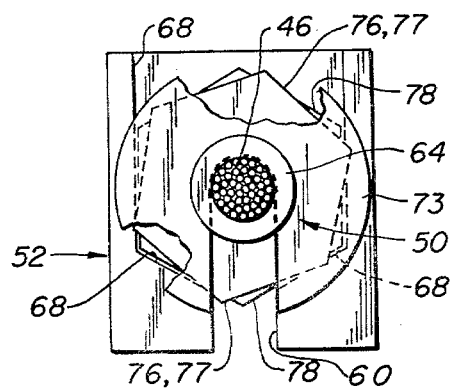
FIG._4.

CONNECTOR FOR LOADED WIRE ROPE

BACKGROUND OF THE INVENTION

This application is a continuation-in-part application of application Ser. No. 861,604 filed Dec. 19, 1977, which is a continuation-in-part application of application Ser. No. 763,188 filed Jan. 27, 1977 (now U.S. Pat. No. 4,078,298, issued Mar. 14, 1978).

1. Field of the Invention

The invention relates to suspension drive arrangements for rotary drums and particularly to wire rope and connector mechanisms used to attach wire ropes in continuous loops to drive rotary kilns, agglomerators and the like.

Cable suspended drums find wide application in installations processing ore, coal, cement and the like wherever rotary motion of a loose, heavy load is needed.

Connector pieces are generally used to connect wire rope ends to permit adjustment and replacement of the endless wire ropes. In corrosive or abrasive environments, a wire rope can be expected to wear most rapidly at its connector piece, and particularly at the juncture of the wire rope with a bridge piece of the connector piece. Furthermore, many types of connector pieces of the known prior art shorten the effective length of the rope loop upon riding over the curved track of a sheave or drum. The result is increased tension on the wire rope unevenly loading the rope, which consequently accelerates wear.

2. Description of the Prior Art

Typical installations wherein a connector piece is employed with a drum suspended by a chain or wire rope system from overhead sheaves are described in U.S. Pat. Nos. 3,097,834, 3,401,924, 3,669,433 and 4,078,298. These known prior art patents disclose connector pieces and cable adjustment devices which represent the state of the art. In the present application, the problems identified herein are concerns not sufficiently addressed in the known prior art.

SUMMARY OF THE INVENTION

An end connector piece for a wire rope suspension system has a shifting mechanism to inhibit wear and has body members which inhibit undesired binding of loaded wire ropes internal to the connector piece. In a specific embodiment, two substantially identical body members are adapted to be preassembled on ends of a wire rope and thereafter coupled together in place in the suspension system. Splice bars attach the preassembled members to a displacement mechanism. To minimize resistance to shifting under load, each of the body members includes a sheave mounted to a journal bearing through the preassembled members. The journal bearing and sheave permit a desirable displacement of tensioned rope ends relative to the body members of the connector piece bearing the load.

The reliability and lifetime of a cable suspension system and rotary drums are increased by provision of a displacement mechanism and load-bearing sheaves. Other advantages of the invention will be apparent upon consideration of a detailed description of the particular embodiments. Many of the features have wider application than herein specifically disclosed. For example, the connector pieces may be used with any rope drive system wherein fatigue and wear may be a concern.

BRIEF DESCRIPTION OF THE DRAWINGS

The invention will be best understood by reference to the following detailed description taken in conjunction with the accompanying drawings in which:

FIG. 1 is a side elevational view in partial cross-section of a wire rope connector according to the invention;

FIG. 2 is a cross-sectional view along line 2—2 of FIG. 1;

FIG. 3 is a cross-sectional view along line 3—3 of FIG. 1;

FIG. 4 is a cross-sectional view along line 4—4 of FIG. 1.

DETAILED DESCRIPTION OF THE PREFERRED EMBODIMENTS

The present invention is closely related to U.S. Pat. Nos. 3,097,834, 3,401,924, 3,669,433, 4,078,298 and application Ser. No. 861,604 filed Dec. 19, 1977, and therefore the disclosures of those patents and applications are incorporated herein by reference and made a part hereof. The present invention relates to inventive improvements on the devices described and disclosed in the above-named patents. Application Ser. No. 861,604 discloses an automatic hydraulically activated shifter mechanism.

One embodiment of rope connector 10 for the apparatus is shown in FIGS. 1-4. The connector 10 comprises two sets of body pieces 12, 14 and 16, 18 joined by splice bars 20, 22. The body pieces 12, 14 and 16, 18 are mated in complementary pairs along a medial plane in which the surfaces abutting to one another to define a cavity 24, 26 with each body piece forming a half shell of the cavity along the medial plane. A sheave 28 is mounted on the medial plane within the cavity 24 of body pieces 12, 14 with its axis perpendicular to the plane. Similarly, a sheave 30 is mounted on the medial plane within the cavity 26 of body pieces 16, 18.

An axle pin 32 extends across the cavity 24 between body pieces 12, 14 through the sheave 28. Bearing inserts 34 are provided around an axle cavity of the sheave 28 which ride on the pin 32 to form a journal bearing. Similarly, an axle pin 36 extends across the cavity 26 between body pieces 16, 18 through the sheave 30, and bearing inserts 38 are provided around the axle cavity of the sheave 30 which ride on the pin 34 to form a journal bearing. The sheaves 28, 30 are freely rotatable within the cavities 24, 26 of the connector 10. Each sheave 28, 30 is provided with an annular recess 40, 41, on its rim. Grooves 42, 44 which are outwardly disposed to receive a wire rope 46 are provided along mating margins of the body pieces 12, 14, 16, 18. The grooves 42, 44 follow a path along the medial axis of the body pieces 12, 14 and 16, 18 and are symmetrically positioned so that the grooves are substantially in longitudinal alignment with the annular recesses 40, 41 of the sheaves 28, 30.

The wire rope 46 is disposed in the grooves 42, 44 and in the annular recesses 40, 41 in a 180 degree arc. The ends 48, 50 of the wire rope 46 are not secured to the body pieces 12, 14 and 16, 18 but rather are secured to a shifter bar 52.

The shifter bar 52 is an element with a straight recessed guideway 54 which is sufficiently wide to accommodate the body pieces 12, 14 and 16, 18 in a track.

End stops 56, 58 are provided at each end of the guideway 54 which, as illustrated in FIG. 4, have an opening 60 through which untensioned ends 48, 50 wire rope 46 can be slipped.

The ends 48, 50 may be secured to the end stops 56, 58 by means of ferrules 62, 64 swaged to the ends 48, 50. The ferrules 62, 64 rest on slotted washers 72, 73 having an inside cavity diameter substantially the diameter of the wire rope 46 but narrower than the diameter of the ferrules 62, 64. The first slotted washer 72 rests directly on one end of the shifter bar 52. The second slotted washer 73 rests against a length adjustment mechanism 70 which in turn rests against the opposing end of the shifter bar 52. Slotted hex corner keepers 66, 68 may be provided at each end of the shifter bar 52 to inhibit hex heads from twisting.

The length adjustment mechanism 70 (FIGS. 1 and 4) may consist of the slotted washer 73, adjusting nuts 76, 77 and a hollow shank hex head capscrew 78. The adjacent nuts 76, 77 are mounted on the shank of the capscrew 78 and separate the slotted washer 73, which rides against the ferrule 64, from the end of the shifter bar 52 to provide variable spacing and hence cable tension adjustment. The hex head of capscrew 78 is held by keeper 68.

Referring again to FIGS. 1, 2 and 3, the shifter bar 52 further includes a dorsal plate 82 which mates with an external track (not shown) for preventing the connector 10 from tipping when passing along the straight lengths of rope 46 between the sheaves (not shown) around the drum (not shown) and located overhead supporting the drum (not shown). In addition the shifter bar 52 includes longitudinal slots 84, 86 along the sides of the guideway 54. Keeper shoulder bolts 88, 90 are mounted through the slots whereby the shifter bar 52 is secured to the body pieces 12, 14 and 16, 18.

To effect displacement adjustment of the shifter bar 52 relative to the body pieces in a manual shifting mechanism, the keeper bolts 88, 90 are temporarily loosened to allow the shifter bar 52 to move. An automatic shifting system without keeper bolts may also be employed as described in the parent applications. The rotatable sheaves 30, 32 promote desirable shifting under the tension of a load.

Since the wire rope 46 does not cross end strands within the connector 10 as herein described, it can be readily assembled and disassembled in stages, i.e., partially in the shop and partially in the field. The rope ends 48, 50 with the adjustment mechanism 70 can be assembled first. Then each pair of body pieces 12, 14 and 16, 18 with sheaves 28, 30 can be bolted together and mounted separately to the ends 48, 50 of wire rope 46 without closing the rope loop. Thus the assembly to this point need not be on site.

Thereafter the assembled body pieces can be mated nose to nose in the guideway 54 of the shifter bar 52 with the wire rope ends 48, 50 loosely secured, the wire rope 46 in position in its track on the drum (not shown), and the keeper bolts 88, 90 holding the body pieces in the guideway 54.

Then the body pieces can be secured together nose to nose by splice bars 20, 22 on either side. Finally any remaining slack can be removed by extending and tensioning the adjustment mechanism.

Having thus explained the invention and specific embodiments and also having pointed out the various advantages of aspects of the invention, it should be understood that still further embodiments are contemplated without departing from the scope of the invention. Therefore, it is not intended that this invention be limited except as indicated by the appended claims.

What is claimed is:

1. A connector for securing end portions of a wire rope in an endless loop for bearing a load such as a drum, said connector comprising:
   a first body piece;
   a second body piece substantially identical to said first body piece;
   means slidably connected with said first body piece and said second body piece for shifting said first and second body pieces relative to end portions of said wire rope, said shifting means including means for holding said end portions; and
   bar means for splicing said first body piece to said second body piece;
   said first and second body pieces each including rotatable sheave means, said first and second body pieces each comprising a first half shell and a second half shell, said first half shell mating to said second half shell along a medial plane to define a cavity for said sheave means, said sheave means comprising a sheave and a sheave pin, said sheave pin being mounted perpendicular to said medial plane across said cavity through said sheave, said medial plane bisecting said sheave, and each said body piece including a recess along said medial plane for aligning said wire rope with said sheave means, said first and second body pieces for fixably bearing said wire rope such that frictional resistance between said wire rope and each one of said body pieces is minimized upon translation of said body pieces relative to said end portions.

2. A connector according to claim 1 wherein said splicing bar means comprises first and second bars disposed along lateral surfaces of said body pieces and secured to said body piece in rigid relation with one another.

3. A connector according to claim 1 wherein said sheave and said recess define a wire rope path around said sheave such that the path of said wire rope is reversed around said sheave and said rope end portions can be secured without crossing of said wire rope.

4. A connector according to claim 3 wherein said shifting means comprises a bar having a recessed guideway therein for mounting of said body pieces and wherein the side of said guideway includes a slot along the length of said guideway.

5. A connector according to claim 3 wherein at least one of said rope end portions includes means for adjusting the fixed end position of said end portion relative to said shifter bar, said adjusting means comprising an extension means about said wire rope and a hollow shank capscrew disposed about said wire rope and connected to said extension means, said extension means and capscrew variably spacing said end portion of said wire rope from said shifter bar.

* * * * *